UNITED STATES PATENT OFFICE.

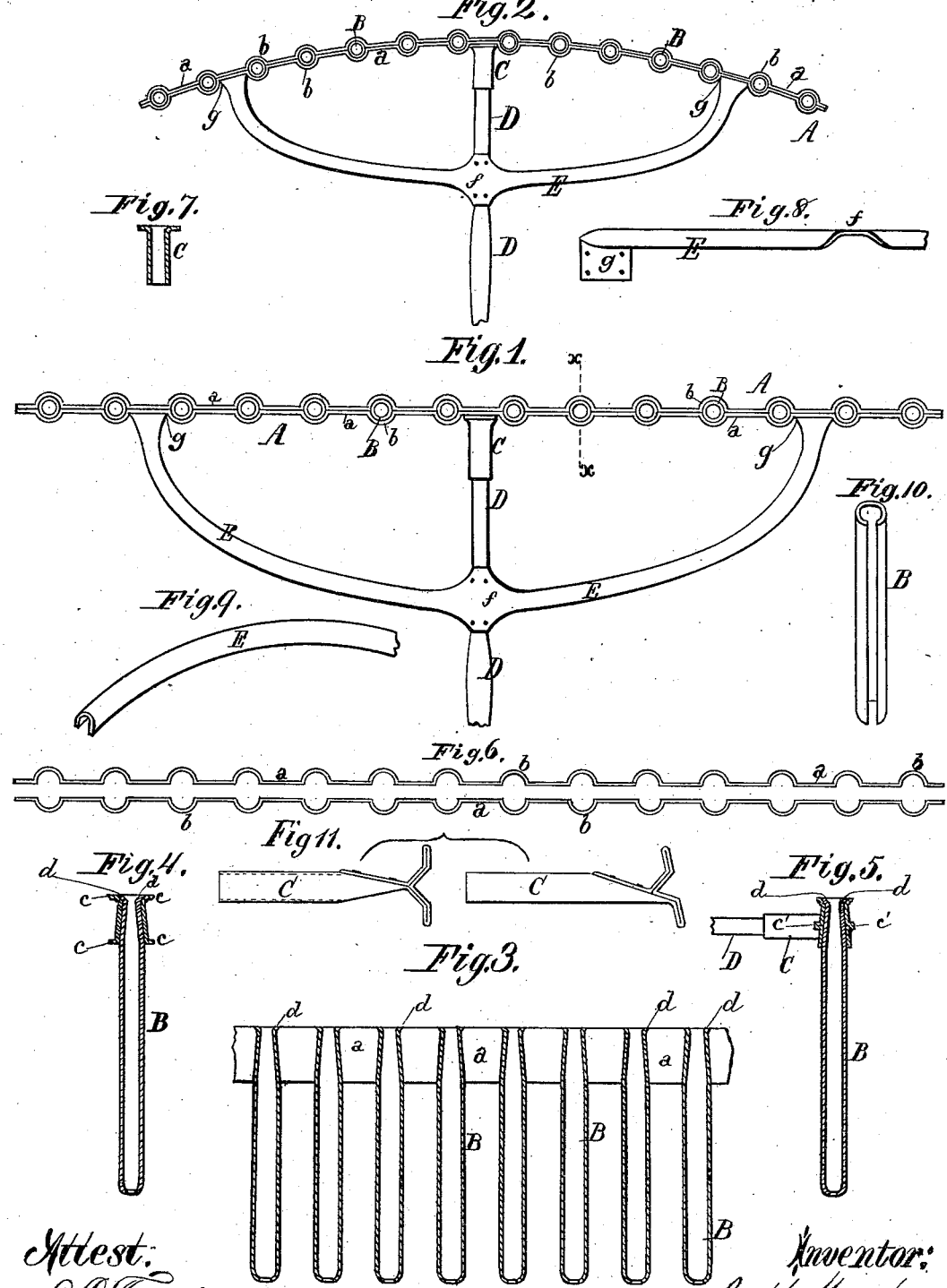

JOSEPH MOORE, OF GREELEY, COLORADO.

RAKE.

SPECIFICATION forming part of Letters Patent No. 294,658, dated March 4, 1884.

Application filed October 17, 1883. (No model.)

*To all whom it may concern:*

Be it known that I, JOSEPH MOORE, a citizen of the United States, residing at Greeley, in the county of Weld and State of Colorado, have invented a new and Improved Hand Field and Lawn Rake, of which the following, in connection with the annexed drawings and letters of reference thereon, is a specification.

My invention relates to a hand-rake for raking either hay in the fields or grass on lawns; and the nature of the same consists in certain novel constructions and combinations of parts, as will be hereinafter fully described and specifically claimed, whereby a very strong yet light rake, comprising a wrought-metal head with circular passages down through it, and formed of two fluted strips, and provided with handle-socket, hollow rake-teeth, and a hollow semi-tubular bow-brace, is produced at a small cost.

In the accompanying drawings, Figure 1 is a top view of my invention as embodied in a hand hay or field rake. Fig. 2 is a similar view of my invention as embodied in a hand lawn or grass rake. Fig. 3 is a broken vertical section of the rake head and teeth shown in Fig. 1. Fig. 4 is a vertical section of the rake-head in the line $x\,x$ of Fig. 1, the handle-socket and bow-brace being removed. Fig. 5 is a broken vertical section in the same line $x\,x$ of Fig. 1, showing a modification of the strips of which the head is formed, the handle-socket and handle being shown, while the brace is removed. Fig. 6 is a top edge view of the two strips from which the head is made. Fig. 7 is a section of the handle-socket. Fig. 8 is a perspective view of a portion of the inverted-U iron bow-brace, bent into curved form, but not flattened at its middle and ends. Fig. 9 is a front view of the piece shown in Fig. 8, flattened at its middle and on one end; and Fig. 10 is a perspective view of a metal tube from which a tooth is formed. Fig. 11 is a modification of the handle-socket.

In the drawings, A represents the rake-head, B the teeth, C the handle-socket, and E the bow-brace, of my improved rake. In Fig. 1 the head is straight, while in Fig. 2 it is curved, and in said straight head the rake-teeth are placed at a greater distance apart and are of greater length than in the curved rake-head. It is believed that the length of the curved rake-head should be about fifteen (15) inches, the straight head about twenty (20) inches, the teeth for the straight rake about one and three-eighths inch apart, and of a length about four (4) inches, while the teeth for the curved rake may be about an inch apart and three (3) inches long; but these proportions may be varied to suit circumstances.

To make the rake-head A, I employ narrow strips $a\,a$, of rolled metal, said metal being formed with semicircular depressions $b\,b$, and with edge flanges $c\,c$, as in Fig. 4, or a middle rib, $c'$, as shown in Fig. 5. These strips, by being rolled with depressions $b\,b$ and flanges $c\,c$, or a rib, $c'$, serve, when brought together, to form slightly-tapered circular receptacles for the teeth, and are very stiff and strong, although quite light. In rolling the metal strips I make the parts which form the circular receptacles for the teeth with a slightly-downward flare, so that the teeth when in position shall not have a chance to rise upward between the strips, as shown in Figs. 3, 4, and 5 of the drawings. The head-pieces $a\,a$ described are riveted together upon the teeth after the teeth are in their proper places.

To make the teeth B, I employ sheet metal rolled or bent into tube form, as shown in Fig. 10. The tubes for the teeth have their upper ends slightly drawn in, so as to form a taper thereon, while their lower ends are drawn down to a rounded or pointed shape, as shown, by any of the well-known drop-press processes. The teeth, after being placed in between the strips $a\,a$, and the said strips riveted together, are themselves riveted at $d$ by mashing down their upper ends upon the rake-head. The handle-socket C is flanged and formed of either wrought metal, malleable iron, or cast metal, and it is riveted to the head, as shown, by its flanged portion.

The bow-brace E is formed of straight semi-tubular or inverted-U metal, bent or bowed, and flattened at $f$, to fit the handle D and be riveted thereto, and also flattened and bent downward at $g\,g$, to fit against the front of the rake-head and be riveted thereto, as shown in the drawings. This brace is a very light, strong, and stiff one for a rake-head.

The rake described, whether with straight or curved head, is exceedingly strong and durable, and yet very light and cheap, and will be found far preferable to cast-metal or wooden rakes.

I propose to use scrap or hoop iron which is rolled cold by polished rolls, and it is thought such iron, although thin and light, will, on account of its being rolled cold, be rigid or stiff enough without flanging it at its edges or ribbing it at its middle. I however shall use flanged or ribbed metal which is rolled hot.

To form the socket for handle of sheet metal, one piece of sheet-iron may be shaped and doubled together, so as to form a socket with flanges, and the flanges may be riveted to the head of the rake, said flanged portion having a V-shaped recess to fit over the center rib of the rake-head, as seen in Fig. 11.

In the manufacture of the within-described metal rake, all of the parts (excepting the handle) after being put together may be tinned, so as to prevent rust and give neatness of finish.

What I claim as my invention, and desire to secure by Letters Patent, is—

1. The rake-head provided with a suitable handle-socket, and formed of two wrought-metal strips, *a a*, with upwardly-tapered semicircular depressions *b b*, and riveted upon the top of rake-teeth, substantially as and for the purpose described.

2. The rake-teeth formed of tubular wrought metal brought to a taper at tops, rounded at points, and riveted upon the rake-head, substantially as and for the purpose described.

3. The bow-brace of the rake, formed of a piece of inverted-U metal bent or bowed, and flattened at its middle, and riveted to the handle, and also flattened at its ends and bent down and riveted to the head, substantially as described.

4. The combination of the rake-head A, formed of strips *a a b b*, rake-teeth B, and the U-metal bow-brace E, substantially as and for the purpose described.

5. A metallic rake with its head formed of two wrought-metal ribbed strips, *a a*, having upwardly-tapered semicircular depressions *b b* formed in them, and provided with a wrought-metal handle-socket, C, and with separated or single wrought-metal hollow teeth, B, confined between the strips by rivets, and kept from vertical movement by being riveted upon the top of the strips, substantially as described.

6. The combination of the wrought-metal flanged handle-socket C, the wrought-metal rake-head A, formed of ribbed strips *a a*, and the tubular rake-teeth B, substantially as described.

JOSEPH MOORE.

Witnesses:
L. VON GOHREN,
JOHN J. PEARSON.